United States Patent [19]

Sitz

[11] 4,213,778
[45] Jul. 22, 1980

[54] PROCESS FOR TREATING A MUD PRODUCED DURING GAS SCRUBBING IN A BLAST FURNACE OR A STEELWORKS

[75] Inventor: Claus Sitz, Lübeck, Fed. Rep. of Germany

[73] Assignee: Metallhüttenwerke Lubeck GmbH, Fed. Rep. of Germany

[21] Appl. No.: 972,419

[22] Filed: Dec. 22, 1978

[30] Foreign Application Priority Data

Dec. 24, 1977 [DE] Fed. Rep. of Germany ....... 2758118

[51] Int. Cl.$^2$ .............................................. C21B 3/04
[52] U.S. Cl. ......................................... 75/25; 75/28; 75/41; 75/256
[58] Field of Search ................ 75/4, 25, 28, 41, 42, 75/256

[56] References Cited

U.S. PATENT DOCUMENTS 3,547,623  12/1970  Larpenteur ............................. 75/25

FOREIGN PATENT DOCUMENTS 1137808  12/1968  United Kingdom ..................... 75/25

*Primary Examiner*—M. J. Andrews
*Attorney, Agent, or Firm*—Holman & Stern

[57] ABSTRACT

A process for treating mud produced during gas scrubbing in a blast furnace comprises decanting water from the mud to produce a mud concentrate which is still free flowing and adding a reducible carbon additive to the concentrate. The resultant mixture is passed to a rotary tube furnace where it is dried and then heat treated at a temperature of 900° C. to 1300° C. so as to ensure agglomeration, volatilization of zinc and lead and at least partial reduction of iron oxides in the mixture. After discharge and cooling, the material from the furnace is added to charge material for iron making.

20 Claims, 1 Drawing Figure

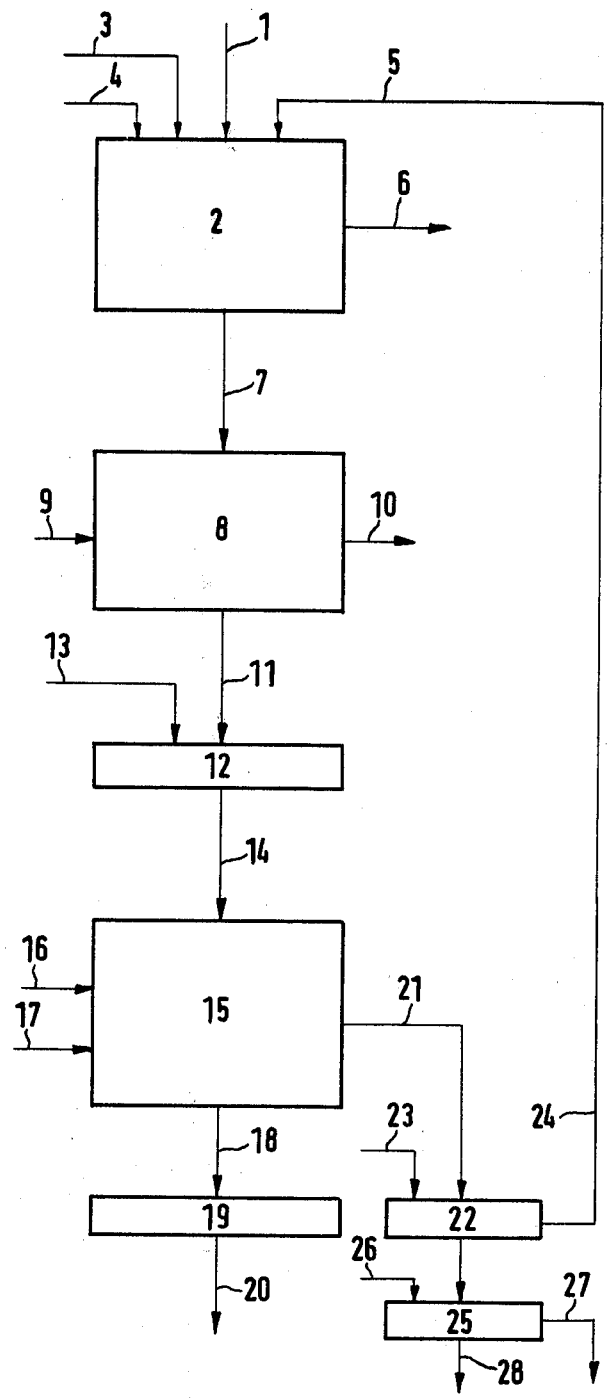

PROCESS FOR TREATING A MUD PRODUCED DURING GAS SCRUBBING IN A BLAST FURNACE OR A STEELWORKS

The invention relates to a process for treating mud residues arising in the cleaning of gases from blast-furnaces and steelworkers, particularly blast-furnace throat gases, subject to concentration in connection with the cleaning process.

Such a process is known from West German Patent 25 19 810. For the purpose of sintering installations, mud residues of this type can only be considered as having a limited recovery limit with respect to their zinc-, lead and alkaline contents so that the muds are first dewatered to a moisture content of 10 to 16 parts % by weight of $H_2O$, then pelleted with an accompanying increased moisture content of 17 to 30 parts % by weight of $H_2O$, the green pellets then being fed into a rotary drying furnace with an addition of solid reducing material. Owing to the necessary extensive dewatering and pelletising this process is costly.

The purpose of the invention is the development of a process of the initially named type, whereby the preparation costs are greatly reduced, the result of the process being a material which will allow effective exploitation from the steelworks viewpoint.

This is achieved effectively by the fact that the mud is subjected to a decantation process, and is then mixed in its still liquid-flowing form with an addition of granular reducible carbon, the mixture still containing approx. 35 to 55% by weight of $H_2O$ being fed into a rotary tube furnace and dried in the gas counter-flow and in the main part of the furnace at a temperature of 900° to 1300° C., with the nodulizing, the volatilisation of zinc and lead and at least a partial reduction of the iron oxide, followed by addition to charge materials for iron production after extraction and cooling.

The processing of blast-furnace throat gases particularly requires the mud in the free-flowing condition to be adjusted to a basic $(CaO+Mgo)/SiO_2$ level of solids to 1.2–1.5 approx. by the addition of lime, the mixture containing 45 to 55% by weight of $H_2O$ being fed into the rotary tubular furnace, and after discharge and cooling from the furnace, being added to the blast furnace charge.

In this manner, the relevant mud residues still containing a high moisture proportion, which may be around 50% by weight as an average in blast-furnace residues, can be fed without intermediate treatment and in a single operation into the rotary furnace, being processed into a form which allows discharge from the furnace and addition to the charge for iron production. In the case of iron oxides extensively reduced to metallic iron, such materials may be melted down for iron production, and can be added directly to the blast-furnace charge in an effectively nodulized manner. Even a lesser nodulisation and reduction still allow advantageous operation and addition to the iron-making materials circuit, for instance as an additive for sintering or in certain cases also for coke-production.

It is particularly important in all modes of application to ensure the discharge of the material from the furnace in a condition of extreme volatilisation of the lead and zinc, so that such accompanying elements do not exert any further prejudicial effect on the blast-furnace. The discharged material is of granular to coarse grain-size and of an extensive mechanical strength. The material has a good porosity, the grain size being for instance 10%<0,5 mm—10%<1,0 mm—25%<3,0 mm—15%<5,0 mm—30%<10,0 mm and 10%<10,0 mm. Although the sintering of the material is of a satisfactory nature, part of the iron in the residue is nevertheless in the metallic condition. Alkalis are extensively volatilised in the agglomerate, should they not already have been removed by washing in the water soluble condition. Naturally the agglomerated material contains practically no further volatile components.

Adjustment of the basic index to the proposed value ensures that on passing through the rotary furnace, the fusing phases leading to a build-up can be reliably avoided. Although the adjustment of the basic index by the addition of lime is normally unavoidable, since normal muds occurring during blast-furnace throat-gas cleaning show a basic level of 0.7 to 1,0 in those cases where a special charge with for instance a high carbonic acid content is processed, higher basic indices can be admitted exceptionally, thus allowing a corresponding reduction in the lime addition.

The composition of the mud at the discharge from the throat gas cleaning point also features approx. 80% by weight of $H_2O$ and 20% by weight of solids.

One half of the water can be removed by decantation, so that the mud finally contains 40 parts of $H_2O$ and 20 parts of solids. In this condition it is not yet thixotropic, and will flow without difficulty. A particular advantage is that with a proportion of approx. 500 g of solids/litre, a lime slurry can be used to adjust the basic index. This slurry is often available as a useless by-product without further expenditure, for instance in the form of slurry left when producing acetylene. In addition to $Ca(OH)_2$ the muds contain so much water that the flowability of the mud to be processed is not modified by the addition of approx. 5% by weight related to the solids. Fine coke dust is preferably added as a reducible carbon, usually a proportion of 10 to 15% by weight related to the dry mixture. It is important for the addition of reducible carbon, that efficient gasification of the material charged into the rotary furnace is ensured. In this way the reducible carbon is able to react with the iron oxide by direct reduction. A particularly good agglomerated material is obtained, when the rotary furnace treatment temperature is maintained extensively between 1000° and 1200° C.

Finally the operation of the rotary furnace requires an oxidising atmosphere, by means of which the part reduction taking place in the solids cannot be excluded. The oxidising atmosphere requires the volatilisation of lead and zinc in such a manner that lead compounds will volatilise in the oxidic condition, whereas zinc will also volatilise and then be oxidised in the gaseous phase. In this manner, the oxides of both metals are diverted in the vapor state with the counter-gas flow.

The exhaust leaves the tubular furnace at a final temperature of only 200° to 300° C. As a result of the large water proportion in the charge material, the exhaust reaches that low temperature in the zone where the water is vapourised, thus cooling from a temperature of approx. 1000° C. to the range quoted above. As a result of the reduction in gas volume associated therewith, the flow speed at the discharge from the furnace reduces accordingly, so that coarser particles of the pneumatically entrained fly-ash drop within the furnace, whereas the exhaust leaving the tubular furnace undergoes a corresponding enrichment in lead oxide and zinc oxide. This oxide-enrichment is so considerable that a further exhaust treatment is justified, the relevant oxides being separated by post-installed wet separation as a result of the split gravity separation from the pneumatically entrained fly-ash, the exhaust undergoing yet a further cooling stage by water-spraying. Whilst the precipitated pneumatically entrained fly ash can be recycled into the material fed to the furnace, the residual exhaust is finally precipitated in the wet condition at 60° to 70° and can be reprocessed again after concentration. This processing is effective, in that the dry substance of the latter muds still contains 50 to 60% of zinc and 10 to 15% of lead.

In a particularly effective design of the process according to the invention, the mud proceeding from the blast-furnace throat-gas cleaning is dewatered by filtration after decantation, preferably in a drum-filter. Further washing water can be added during the process, so that alkaline compounds can be extensively washed out. In such a type of dewatering, the wet range for the tubular furnace charge is particularly reliable, owing to the physical properties of the mud.

In a further advantageous form of the invention, the granular reducible carbon is first added after the dewatering process is completed. This has the advantage that the dewatered thixotropic mud in the form of filter-cake, can be maintained relatively free from the abrasive-effect particles, since these are known to be in the $\mu$-range. The mud is therefore easily mixed and conveyed up to that stage. The addition of carbon at the filter outlet leads to the coating of the carbon particles with thixotropic material, thus avoiding any prejudicial abrasive effect. The mud processed in this manner can thus be conveyed by piston-pump or diaphragm-pump, being liquefied as a result of the kinetic energy entrained therein in accordance with the behaviour of thixotropic materials. In this liquefied condition, it can be conveyed at suitable speeds in ducting systems, without first becoming pasty. When the ducting system ends in the immediate vicinity of the rotary furnace, a low-energy feed can be ensured without excessive wear phenomena.

Whereas the rotary furnace can be operated preferably at an adjustable speed of 1:3 to 1:5, so that the charge stays from 0.5 to 2 hours in the furnace, the layer height of the charge is maintained at a suitable level suiting the working conditions.

The suggested process sequence is particularly energy-saving in operation for the reasons outlined above; furthermore, it allows the recovery of valuable raw materials, without allowing them to contribute to environmental pollution.

As a further illustration of the invention, reference should be made to the drawing.

The prepared muds 1 are ducted to collecting tanks 2, in which they are decanted, mixed and stirred. Hydrated lime 3 is added, and the same with waste mud 4 up to a given level. Furthermore, the collecting tanks 2 receive a return-mud feed 5 from a circuit not shown here.

The decantate 6 is drawn off, and is ducted into an effluent processing plant not shown in any further detail.

The mud mixture 7 passes from the collecting tank 2 into the vacuum filter 8, further sprayed with washing water 9, and water-soluble mud ingredients are thus removed with the filtrate 10. The filtrate also flows towards the effluent processing plant not shown in any further detail.

The thixotropic mud 11 is fed from the vacuum filter 8 together with coke dust 13 by means of a sludge pump 12. The sludge pump liquefies the thixotropic mud and ensures the coating of the coke dust particles with mud as previously described. This sludge 14 is fed directly to the rotary furnace 15, into which combustion air 16 for a limited volume of heating gas or oil 17, or for a proportion of coal added to the charge.

The agglomerate 18 is now available in the hot condition at the discharge from the rotary furnace. It is collected in the reception bunker 19 then transferred as charge material 20 to the blast-furnace or elsewhere.

The gas 21 leaving the rotary furnace 15 is processed in a first exhaust scrubber 22 with the addition of water 23 in the manner illustrated, so that the muds 24 containing the pneumatically- or mechanically- entrained fly-ash is drawn off and can be returned as return-mud 5 to the collecting tanks 2. In a second exhaust scrubbing unit 25 the main cleaning operation occurs with the addition of further water 26, so that the muds 27 thus obtained can be ducted towards an economical zinc and lead processing unit, whereas exhaust 28 may be discharged in an extensively non-toxic and dust-free condition from the complete process.

The foregoing process layout is based essentially on the treatment of a process mud. In particular it is intended for mud produced in a fresh condition from the blast-furnace throat-gas cleaning plant, thus subjecting the mud to decantation in the freshly produced condition.

I claim:

1. Process for treating muds produced during gas scrubbing in blast-furnace and steelworks, more particularly arising out of blast-furnace throat-gas cleaning, and subjected to concentration after the cleaning process, characterised in that, the mud is subjected to a decantation procedure, and is then mixed with a granular reducible carbon addition while still in the free-flowing condition, the mixture being fed in a condition containing 35 to 55% by weight of $H_2O$ directly to a rotary tube furnace then being dried in said furnace with a countercurrent gas flow and the said mixture being treated extensively in the furnace zone at a temperature of 900° to 1300° C. under conditions ensuring agglomeration, volatilisation of zinc and lead and at least partial reduction of the iron oxides, then added to the charge material for the iron-making after discharge and cooling.

2. Process to claim 1, characterised in that, the mud in the still free-flowing condition is adjusted to a basic index $(CaO+MgO)/SiO_2$ of its solids at 1.2 to 1.5 by the addition of lime, then fed to the rotary furnace in a condition containing 45 to 55% by weight of $H_2O$, then added to the blast-furnace charge after discharge and cooling from the rotary furnace.

3. Process to claim 2, characterised in that, the treatment in the rotary furnace in the oxidising atmosphere is implemented in such a manner, that a partial reduction of the iron oxides in the charge material is ensured by the carbon in the charge material and the lead and zinc content of the adjusted material is reduced by volatilisation and discharge of these metals in the oxide condition by means of the counter-gas flow.

4. Process to claim 2, characterised in that, dewatering of the decanted mud is effected by filtration.

5. Process to claim 4, characterised in that, during the dewatering by filtration, washing water is added to the filter-cake with a view to washing out the water-soluble alkaline compounds.

6. Process to claim 2, characterised in that, the granular reducible carbon is first added after the dewatering has been effected to 45 to 55% by weight of $H_2O$.

7. Process to claim 2, characterised in that, the mud is mixed after decantation with a proportion of approx. 500 g solids/liter with a slurry of lime hydrate for the purpose of adjusting the basic index.

8. Process to claim 2, characterised in that, coke-dust with a grain-size up to 10 mm is added to the mud as a reducible carbon.

9. Process to claim 8, characterised in that, the added coke dust represents 10 to 15% by weight related to the dry mixture substance.

10. Process to claim 2, characterised in that, the treatment is effected extensively in the tubular furnace part at a temperture of 1000° to 1100° C.

11. Process to claim 2, characterised in that, wettable dry dust is added to the mud before the dewatering.

12. Process to claim 2, characterised in that, the dewatering is effected in a drum-filter with an adjustable speed for the purposes of the addition.

13. Process to claim 2, characterised in that, the rotary furnace is run at an internal peripheral average speed of 10 m/min and an infinitely adjustable speed in the range of 1:3 to 1:5 in such a manner that the mean dwell time of the charge within the furnace is between 0,5 and 2,0 hours.

14. Process to claim 2, characterised in that, the rotary furnace is operated at an exhaust temperature of approx. 200° to 300° C.

15. Process to claim 2, characterised in that, the smoke-like volatilisation products escaping with the exhaust and containing the zinc oxide and lead oxide, are separated in a subsequent wet cleaning unit by means of fractionated gravity separation from the pneumatically entrained fly ash with cooling and wetting ensured by water spraying, and in that the fly ash separated with the water is fed into the material charged into the furnace, whereas the remaining dust is then wet separated from the exhaust at a temperature of 60° to 70°.

16. Process to claim 2, characterised in that, the charging of the rotary furnace with the material to be used is ensured by a diaphragm- or a piston- dump and a ducting system connected thereto.

17. Process to claim 2, characterised in that, the rotary furnace is operated with additional burners, at least in the heating up phase.

18. Process to claim 17, characterised in that, the rotary furnace is operated with additional air feed.

19. Process to claim 2, characterised in that, the mud is subjected to decantation in the freshly formed condition.

20. Process to claim 7, characterised in that, by-product mud from acetylene production is used as a lime hydrate slurry.

* * * * *

UNITED STATES PATENT AND TRADEMARK OFFICE
CERTIFICATE OF CORRECTION

PATENT NO. : 4,213,778
DATED : July 22, 1980
INVENTOR(S) : SITZ, Claus

It is certified that error appears in the above-identified patent and that said Letters Patent are hereby corrected as shown below:

The additional Priority should be added to Section (30) on the front page of the patent, as follows:

-- Nov. 2, 1978    Austria    7829/78 --.

Signed and Sealed this

Sixteenth Day of December 1980

[SEAL]

Attest:

SIDNEY A. DIAMOND

Attesting Officer    Commissioner of Patents and Trademarks